United States Patent
Nagy et al.

(10) Patent No.: US 8,446,124 B2
(45) Date of Patent: May 21, 2013

(54) METHOD FOR RECHARGING ELECTRIC VEHICLES IN GEOGRAPHICALLY DISTRIBUTED RECHARGING STATIONS

(75) Inventors: Oliver Nagy, Vienna (AT); Refi-Tugrul Güner, Baden (AT); Erwin Toplak, Trumau (AT)

(73) Assignee: Kapsch Trafficcom AG, Vienna (AT)

( * ) Notice: Subject to any disclaimer, the term of this patent is extended or adjusted under 35 U.S.C. 154(b) by 171 days.

(21) Appl. No.: 13/027,082

(22) Filed: Feb. 14, 2011

(65) Prior Publication Data

US 2011/0202476 A1    Aug. 18, 2011

(30) Foreign Application Priority Data

Feb. 18, 2010  (EP) .................................. 10450021

(51) Int. Cl.
*H02J 7/00* (2006.01)
*G06F 17/00* (2006.01)

(52) U.S. Cl.
USPC ............................................ 320/109; 705/412

(58) Field of Classification Search
USPC .......................................... 705/412; 320/109
See application file for complete search history.

(56) References Cited

U.S. PATENT DOCUMENTS

| | | | |
|---|---|---|---|
| 8,014,914 B2 * | 9/2011 | Boss et al. ...................... 701/22 |
| 2003/0069784 A1 * | 4/2003 | Banerjee et al. ................ 705/13 |
| 2006/0184456 A1 * | 8/2006 | de Janasz ........................ 705/72 |
| 2007/0090937 A1 * | 4/2007 | Stabler ....................... 340/450.2 |
| 2008/0086240 A1 * | 4/2008 | Breed .............................. 701/1 |
| 2008/0140278 A1 * | 6/2008 | Breed ............................. 701/29 |
| 2009/0177580 A1 * | 7/2009 | Lowenthal et al. ............. 705/39 |
| 2010/0057306 A1 * | 3/2010 | Ishii et al. ....................... 701/48 |
| 2010/0094496 A1 * | 4/2010 | Hershkovitz et al. ........... 701/22 |
| 2010/0161482 A1 * | 6/2010 | Littrell ............................. 705/40 |
| 2010/0262333 A1 * | 10/2010 | Storgaard ........................ 701/33 |

FOREIGN PATENT DOCUMENTS

| | | |
|---|---|---|
| WO | WO 99/40544 | 8/1999 |
| WO | WO 2006/0127185 A2 | 11/2006 |

OTHER PUBLICATIONS

Extended European Search Report for corresponding European Patent Application No. 10450021.0, dated Jul. 22, 2010, 7pp.
IP.com Prior Art Database; Method, System, and apparatus for reserving the use of a re-charging station for a Plug-in Hybrid Electric Vehicle, 3pp.
Raya, Maxim, et al.; The Security of Vehicular Ad Hoc Networks; XP-002589727; pp. 11-21.
Chen, Yee Ming, et al.; Vehicle-based interactive management with multi-agent approach; Journal of Industrial Engineering and Management; JIEM, Feb. 2009(2), pp. 360-386.

\* cited by examiner

*Primary Examiner* — John Hayes
*Assistant Examiner* — Brian Cook
(74) *Attorney, Agent, or Firm* — Christie, Parker & Hale, LLP.

(57) ABSTRACT

A method for recharging an electric vehicle in a recharging station of a network of geographically distributed recharging stations. The method includes: communicating availability of a recharging station to a control center of the network; transmitting a recharge request from an onboard unit of the electric vehicle via communication devices of a road toll system to the control center; assigning the onboard unit to an available recharging station in the control center; notifying the onboard unit of the assigned recharging station via the communication devices of the road toll system and notifying the recharging station of the onboard unit; and activating the recharging station to recharge the electric vehicle, when the assigned onboard unit is detected therein. The recharging in the recharging station is monitored and an image of the vehicle is recorded in the recharging station in an event of an interruption, interference or deviation in the recharging process from a given course.

11 Claims, 3 Drawing Sheets

METHOD FOR RECHARGING ELECTRIC VEHICLES IN GEOGRAPHICALLY DISTRIBUTED RECHARGING STATIONS

CROSS-REFERENCE TO RELATED APPLICATION(S)

This application claims priority to European Patent Application No. 10 450 021.0, filed on Feb. 18, 2010, the contents of which are hereby expressly incorporated by reference.

FIELD OF THE INVENTION

The present invention relates to a method for recharging an electric vehicle in a recharging station of a network of geographically distributed recharging stations.

BACKGROUND

At present, numerous countries are working on the formation of a extensive infrastructure of recharging stations ("electric filling stations") for electric vehicles. Since, in contrast to conventional filling stations, such recharging stations require a longer stop for vehicles, it would be desirable to assist users to quickly find free recharging stations by efficient management of resources, so that they do not cause unnecessary traffic congestion.

SUMMARY

In some embodiments, the present invention is directed to a method for recharging an electric vehicle in a recharging station of a network of geographically distributed recharging stations. The method includes: communicating availability of a recharging station to a control centre of the network; transmitting a recharge request from an onboard unit of the electric vehicle via communication devices of a road toll system to the control centre; assigning the onboard unit to an available recharging station in the control centre; notifying the onboard unit of the assigned recharging station via the communication devices of the road toll system and notifying the recharging station of the onboard unit; and activating the recharging station to recharge the electric vehicle, when the assigned onboard unit is detected therein. The recharging process in the recharging station is monitored and an image of the vehicle is recorded in the recharging station in the event of an interruption, interference or deviation in the recharging process from a given course.

The security against abuse and manipulation of the process can be significantly increased as a result. For example, dishonest transfer of the charging cable from one vehicle to another can thus be alerted or automatically detected on the basis of photos.

An image of the vehicle can also be recorded in the recharging station by means of the camera at the beginning and at the end of the recharging process.

DETAILED DESCRIPTION

Figure 1:
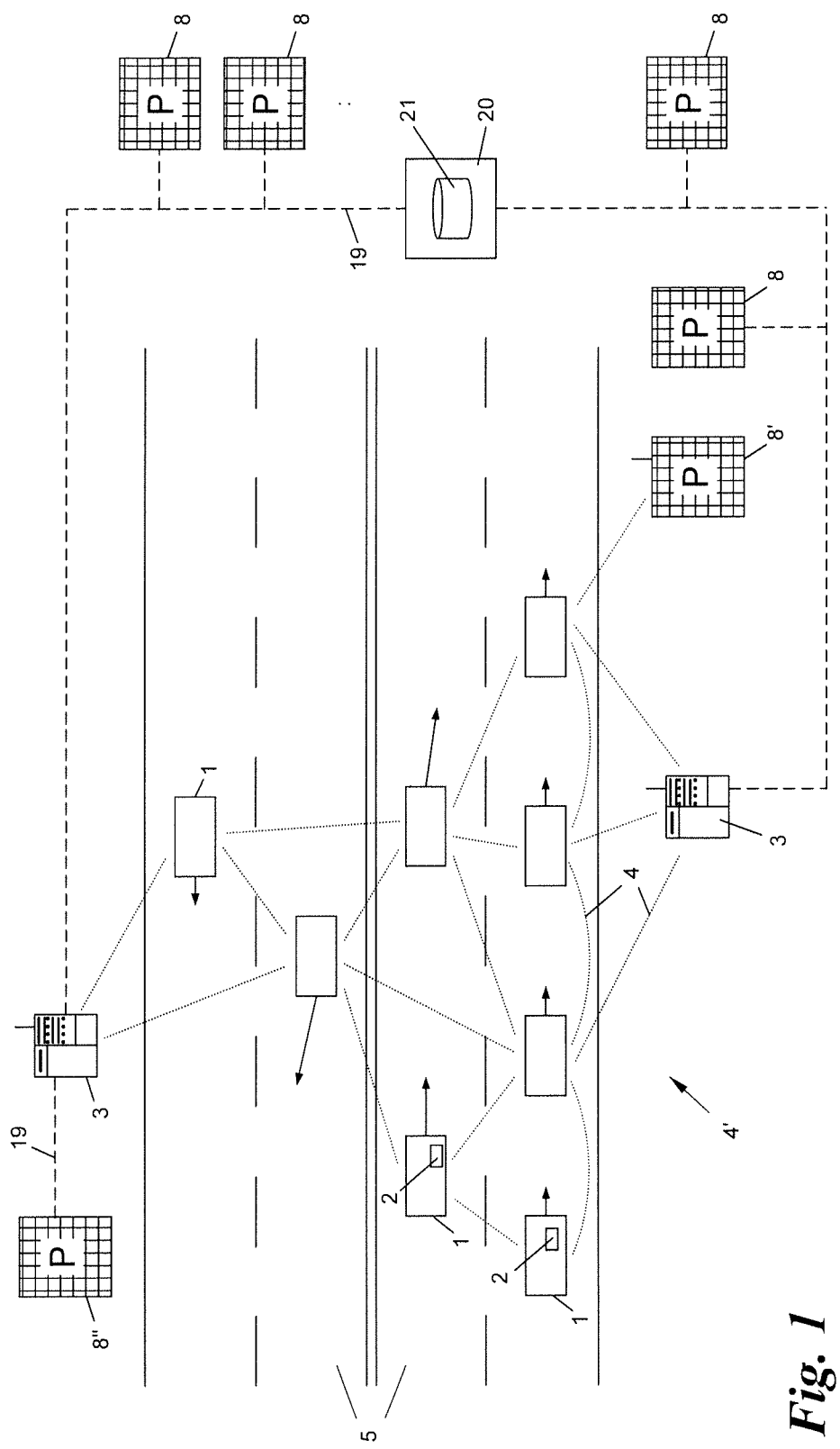
FIG. 1 is a schematic block diagram of a vehicular ad-hoc network and a group of exemplary recharging stations for conducting the process, according to some embodiments of the present invention.

The present invention uses the existing infrastructure of wireless road toll systems for resource management of recharging stations for electric vehicles. By means of the wireless onboard units (OBUs) of the road toll systems requests for recharging can already be made while travelling and notifications of availability can be received promptly via the communication devices of the road toll system while still at a distance from the destination to allow the route to a free recharging station to be planned in advance. The wireless OBUs can be used to detect the vehicle upon entry in the recharging station and to automatically clear (activate, unlock) this. The process of the invention does not need any infrastructure in addition to the existing road toll OBUs and on the operator side, only requires a control centre, which performs the assignment between the recharge requests and the recharging stations, as well as some further communication devices in the recharging stations.

Existing DSRC (dedicated short-range communication) or WAVE (wireless access in a vehicle environment) road toll systems may be used for the process of the invention and therefore the communication devices may be preferably DSRC or WAVE radio beacons of such a road toll system.

According to some embodiments of the invention, the communication of the onboard unit with the DSRC or WAVE radio beacons also occurs by connection through onboard units of other vehicles, which form a vehicular ad-hoc network (VANET) with the said onboard unit. The wireless ad-hoc networks, i.e. networks that are formed from a group of peers (network nodes) that spontaneously connect to one another and are generally highly dynamic because of the movement and changeover of network nodes. The invention considers for the first time using VANETs as relay networks for an OBU-based recharging station management, as a result of which, the communication range can be extended from vehicle to vehicle beyond the direct catchment area of the radio beacons of the road toll system.

The detection of an onboard unit in the assigned recharging station in order to activate this station can be conducted in different ways. According to some embodiments of the invention, the onboard unit is detected in the recharging station as a result of it entering a restricted communication zone of the recharging station. This requires an appropriate transceiver for each recharging station. The onboard unit can be also detected in the recharging station as a result of it being radio-located by a transceiver of the recharging station. The latter means a slightly higher equipment expense for the radio localisation, for example, by triangulation processes or satellite navigation positioning of the OBUs, but a transceiver can also cover multiple recharging stations.

The onboard unit preferably uses an omnidirectional transmit and receive mode for transmitting the recharge request and receiving the assignment notification and a unidirectional transmit and receive mode for its detection in the recharging station. This extends the transmitting-receiving range in the road toll system or VANET and also simplifies detection of the OBU in the recharging station in a restricted communication zone.

In some embodiments, vehicle-specific charging parameters are transmitted from the onboard unit to the assigned recharging station to control the recharging process, and/or payment calculation parameters are transmitted to the control centre or the assigned recharging station for calculating the cost for the recharging process. The vehicle-specific parameters can be, for example, electric charging parameters such as, charging current, charging voltage, charging characteristic etc., or can refer to those parameters filed in a control centre.

According to some embodiments of the invention, the onboard units can be detected when in the vicinity of a recharging station in order to clear an entrance barrier to the recharging station, for example, a car park barrier or a multistorey car park gate etc.

In some embodiments, a short message (SMS) concerning the recharging process, for example, its successful conclusion or a payment made, may be sent via a mobile radio network to a mobile phone of the driver of the vehicle.

FIG. 1 shows a plurality of electric vehicles 1, which are respectively fitted with onboard units or OBUs 2 for communication with radio beacons 3 of a road toll system. The OBUs 2 connect to the radio beacons 3 for communication via wireless connections 4. The wireless connections 4 can be of any type known in the art, for example, DSRC (dedicated short-range communication), mobile radio or WLAN connections, in particular, according to WAVE (wireless access in a vehicle environment) standard. Accordingly, the radio beacons 3 are appropriate DSRC, WLAN or WAVE radio beacons or also base stations of a mobile radio network.

In the present description "electric vehicles" are understood to be any type of vehicles 1 that at least partially require electric current for recharging, for example, this includes hybrid vehicles with combined electric and internal combustion drives.

In some embodiments, local usage of the vehicles 1 can be determined by means of the OBUs 2 and radio beacons 3 and fees can be charged accordingly. The fees may be charged in the form of a road toll for use of a road network 5, local charge for use or stay in a specific area, for example, as city toll, or parking fees for stay in car parks such as the parking spaces 6 of the recharging stations 7 to be explained in more detail below. The OBUs 2 can be of the self-locating type, for example, by independent positioning in a satellite navigation network, and can also be located externally by the radio beacons 3.

The OBUs 2 can communicate not only with the radio beacons 3 but also, amongst themselves via the wireless connections 4, so that they simultaneously form network nodes of an ad-hoc network 4' (VANET). Therefore, communications of the OBUs 2 with the radio beacons 3 can occur not only directly but also via connection from one OBU 2 to the next one within the VANET 4'.

A network of geographically distributed recharging stations 7 serves to recharge the electric vehicles 1. Some of these recharging stations can be respectively combined into local groups 8, for example, in the form of car parks or multistorey car parks. In some embodiments, each recharging station 7 comprises a parking space 6 for parking a vehicle 1 as well as a charging device 9 assigned to the parking space 6 for recharging the vehicle. The charging device 9 is of conventional type and, for example, has a connection socket 10 for the charging cable 11 for supplying charging current to the vehicle 1. The charging device 9 is supplied with current by means of a local power network 12 from a public power supply network 13.

Figure 2:
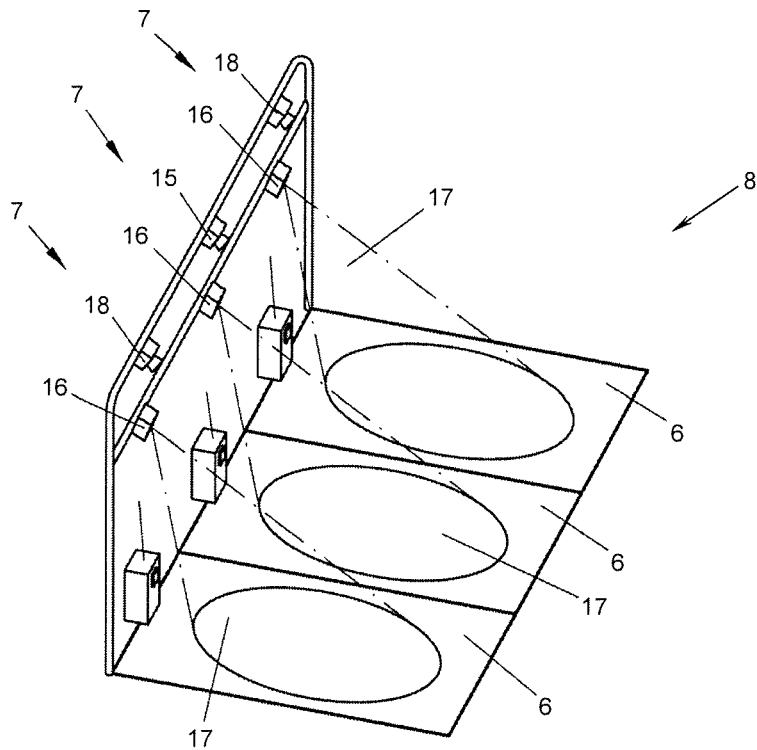
FIG. 2 is an exemplary schematic perspective view of a recharging station, according to some embodiments of the present invention.
Figure 3:
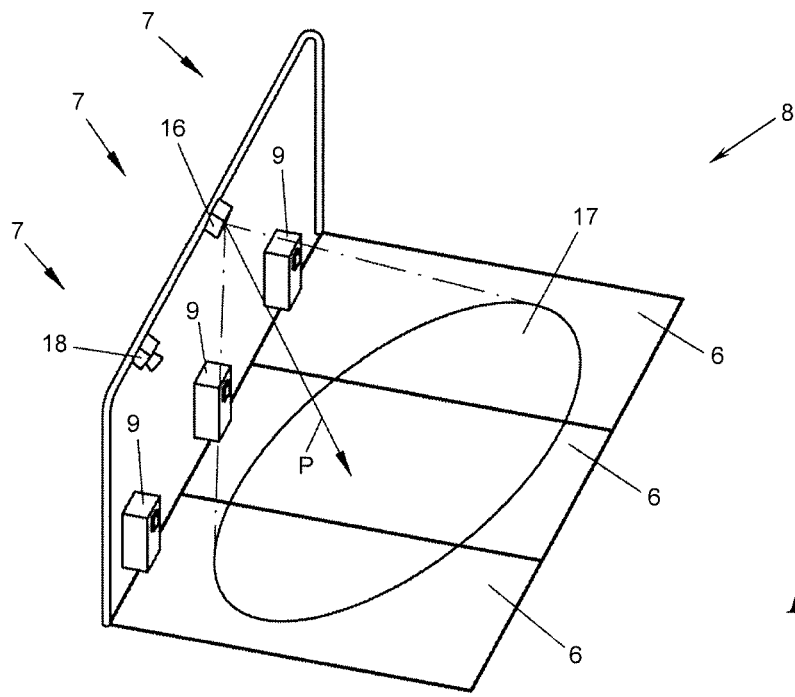
FIG. 3 is an exemplary schematic perspective view of a recharging station, according to some embodiments of the present invention.
Figure 4:
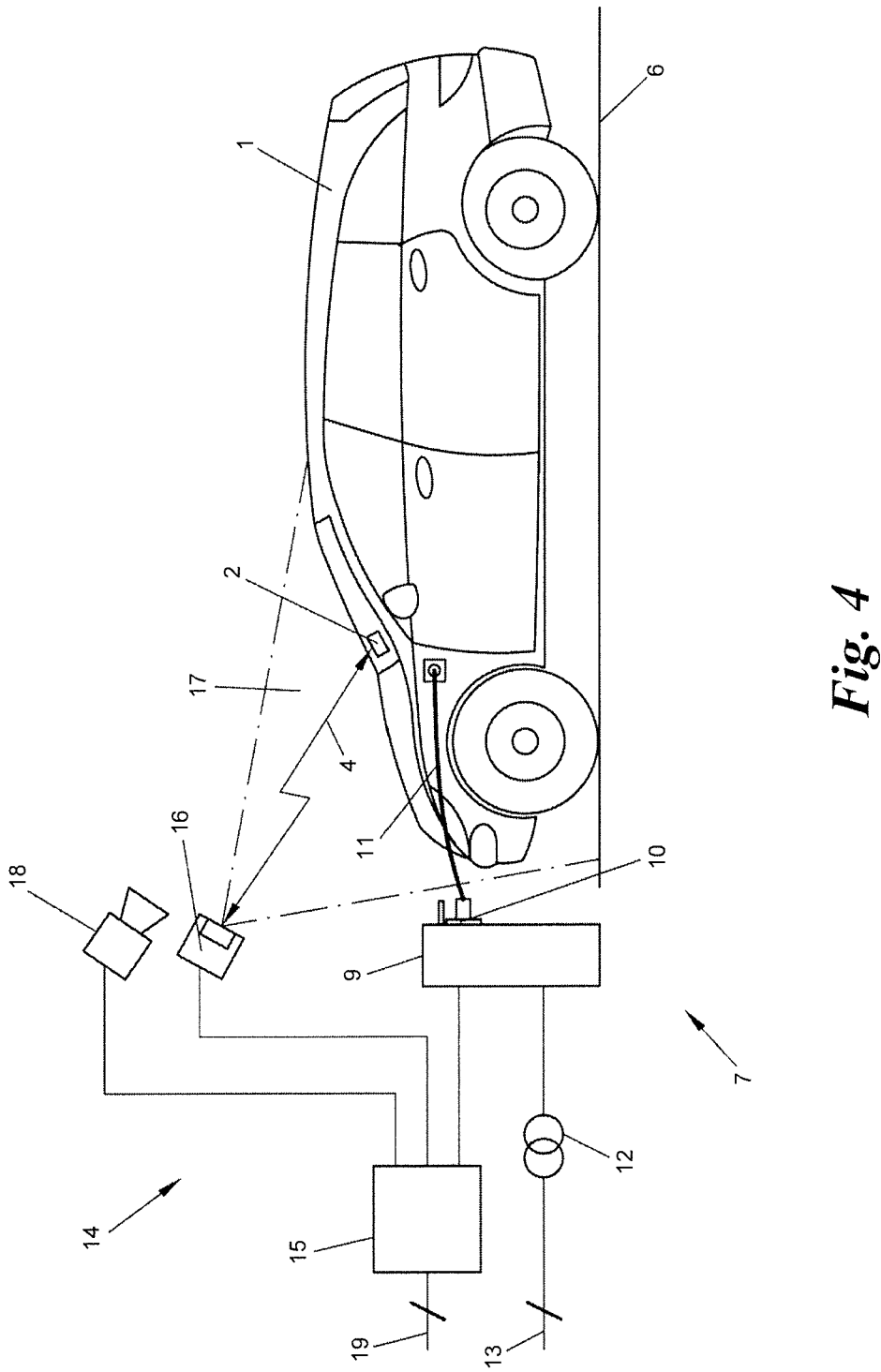
FIG. 4 is an exemplary block diagram of a side view of a recharging station, according to some embodiments of the present invention.

The charging device 9 is controlled by a transceiver 14, which has an electronic module 15 and a duplexer 16 connected thereto. The duplexer 16 has a directed communication zone 17, which is restricted to the region of the parking space 6 of the respective recharging station 7 (FIG. 2). Alternatively, a single transceiver 14 with a larger communication zone 17 covering multiple parking spaces 6 can be provided for multiple recharging stations 7 (FIG. 3). In the latter case, by appropriate configuration of its duplexer 16, for example, the transceiver 14 is configured to locate the location P or an OBU 2 in the communication zone 17.

In some embodiments, a camera 18 directed towards the parking space 6 is connected to the electronic module 15. The charging device 9 monitors the recharging process and in the event of any interruption, interference and/or deviation of the recharging process from a given course, for example, a predetermined charging current or charging voltage range or a predetermined charging characteristic, causes an image to be taken of the vehicle 1 by the camera 18 via the electronic module 15. An image can optionally be taken by the camera 18 for evidence purposes at the beginning and/or at the end of each recharging process.

Returning to FIG. 1, the recharging stations 7 or groups 8 of recharging stations 7 connect via a data network 19 to a control centre 20, which can at the same time be the control centre of the road toll system. The data network 19 can be the same data network via which the control centre 20 communicates with the radio beacons 3, or a different data network. Optionally, the recharging stations 7 or groups 8 can connect to the radio beacons 3 both directly and via the VANET 4', and connect via these to the control centre 20, see group 8' in FIG. 1. In some embodiments, recharging stations 7 or groups 8 are linked directly to a radio beacon 3, as shown by group 8" in FIG. 1.

In some embodiments, the recharging of the electric vehicles 1 in the recharging stations 7 is configured as follows:

Each recharging station 7 communicates its availability, i.e. whether it is vacant or occupied, to the control centre 20 via the data network 19 and/or the VANET 4' and/or the radio beacons 3. This communication can occur continuously, periodically, and/or also only on specific occasions, i.e. upon becoming vacant or when occupied. The control centre 20 records the respective currently available recharging stations 7 in a data bank 21.

In a vehicle 1, the user may transmit a recharge request to the control centre 20 by means of the OBU 2 via the wireless connections 4 to the communication devices of the road toll system, here the VANET 4', the radio beacons 3 and the data network 19.

The charge requests may respectively contain further data such as a desired geographic area (destination), in which the required recharging station should lie, vehicle-specific technical charging parameters such as a specific current consumption, voltage, charging characteristic etc., and/or payment calculation parameters such as the specification of a debit account in the control centre, the specification of an account status of electronic funds in the OBU 2 etc.

In some embodiments, in the control centre 20, the incoming recharge requests are matched against the recharging station 7 recorded in the data bank 21 as being available to find a recharging station 7, that is vacant in the vicinity of the vehicle 1 or in the desired destination area and complies with the technical requirements. The located recharging station 7 is assigned to the OBU 2 requesting recharging and the assignment is recorded in the data bank 21. The OBU 2 is notified of the assigned recharging station 7 via the communication devices of the road toll system, i.e. the data network 19, the radio beacons 3, the VANET 4' and/or the wireless connections 4. The recharging station 7 is likewise notified of the assigned OBU 2.

The vehicle 1 continues on its way to the recharging station 7 indicated to it. As soon as entry of the "correct" vehicle 1, i.e. that with the assigned OBU 2, in the recharging station 7 is detected, the charging device 9 of the recharging station 7 is activated (e.g., unlocked, or cleared) by the electronic module 15. In this case, the detection of the OBU 2 in the recharging station 7 is conducted either by the entry of the OBU 2 in the restricted communication zone 17 of the recharging station 7 or by location (arrow P) of the assigned OBU 2 in the region of the correct parking space 6 of the recharging station 7.

Vehicle-specific charging parameters such as desired charging current, charging voltage, charging characteristic etc., can be indicated to the recharging station 7 via the wireless connection 4 between the OBU 2 and the transceiver 14, unless this has been done already as part of the recharge request. Payment calculation parameters can also be exchanged between the OBU 2 and the recharging station 7 or the control centre 20 in the same way.

In some embodiments, the charging device 9 monitors the recharging process for any interruption, interference or deviation from a given course, for example, a predetermined charging characteristic, and in such a case causes an image to be recorded by the camera 18 via the electronic module 15. An image can also optionally be taken by the camera 18 for evidence purposes at the beginning and at the end of any one recharging process. The recorded images of the camera 18 can be transmitted together with further data of the recharging station 7 to the control centre via the data network 19. As shown in FIG. 3, multiple recharging stations 7 can also share a common camera 18.

In some embodiments, the OBU 2 of a vehicle 1 can also be detected when in the vicinity of the recharging station 7, for example, by adjacent radio beacons 3 or an appropriately expanded communication zone 17, to clear an access barrier (not shown) for entry into the recharging station 7, for example, or a group 8 of recharging stations 7, for example, a multistorey car park.

The recharging station 7 and/or the control centre 20 can also connect with a mobile radio network in order to send a brief message (SMS) concerning the recharging process, for example, the conclusion or a payment made, to a mobile phone of the owner of the vehicle.

In some embodiments the OBUs 2, the radio beacons 3 and/or the transceivers 14 can be switched over between an omnidirectional and a directed (unidirectional) transmitting and receiving mode. In particular, depending on the phase of the outlined process: transmitting the recharge requests from the OBUs 2 and receiving the assignment notifications from the control centre 20, as well, as the connection communication within the VANET 4' via the wireless connections 4 the OBUs 2 may operate in an omnidirectional mode. Additionally, the OBUs 2; for their detection in a recharging station 7 within a restricted communication zone 17 may operate in unidirectional mode. Similarly, the radio beacons 3 or transceivers 14 can communicate in an omnidirectional manner, for example, when they receive vehicle-specific charging parameters or user-specific tolling parameters from the OBUs 2 or are used to clear entrance barriers. However, for locating OBUs 2 in a recharging station 7 they may operate unidirectionally.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for recharging an electric vehicle in a recharging station of a network of geographically distributed recharging stations, the method comprising:
    communicating availability of a recharging station to a control centre of the network;
    transmitting a recharge request from an onboard unit of the electric vehicle via communication devices of a road toll system to the control centre;
    assigning the onboard unit to an available recharging station in the control centre;
    notifying the onboard unit of the assigned recharging station via the communication devices of the road toll system and notifying the recharging station of the onboard unit; and
    activating the recharging station to recharge the electric vehicle, when the assigned onboard unit is detected therein,
    wherein the recharging in the recharging station is monitored and an image of the vehicle is recorded in the recharging station in an event of an interruption or interference in the recharging process from a given course.

2. The method according to claim 1, wherein the image of the vehicle is recorded in the recharging station by a camera at the beginning and at the end of the recharging.

3. The method according to claim 1, wherein dedicated short-range communication (DSRC) or wireless access in a vehicle environment (WAVE) radio beacons of a DSRC or WAVE road toll system are used as communication devices.

4. The method according to claim 3, wherein the communication of the onboard unit with the DSRC or WAVE radio beacons occurs by mediation through onboard units of other vehicles, which form a vehicular ad-hoc network with said onboard unit.

5. The method according to claim 1, wherein the onboard unit is detected in the recharging station when the onboard unit enters a restricted communication zone of the recharging station.

6. The method according to claim 1, wherein the onboard unit is detected in the recharging station when the onboard unit is radio-located by a transceiver of the recharging station.

7. The method according to claim 1, wherein the onboard unit uses an omnidirectional transmit and receive mode for transmitting the recharge request and receiving the assignment notification, and a unidirectional transmit and receive mode for detection in the recharging station.

8. The method according to claim 1, further comprising transmitting vehicle-specific charging parameters from the onboard unit to the assigned recharging station to control the recharging.

9. The method according to claim 1, further comprising transmitting payment calculation parameters to the control centre or the assigned recharging station for calculating a cost for the recharging.

10. The method according to claim 1, further comprising clearing an entrance barrier to the recharging station when the onboard unit is detected in the vicinity of the recharging station.

11. The method according to claim 1, further comprising sending a short message concerning the recharging process via a mobile radio network.

* * * * *